Patented July 24, 1928.

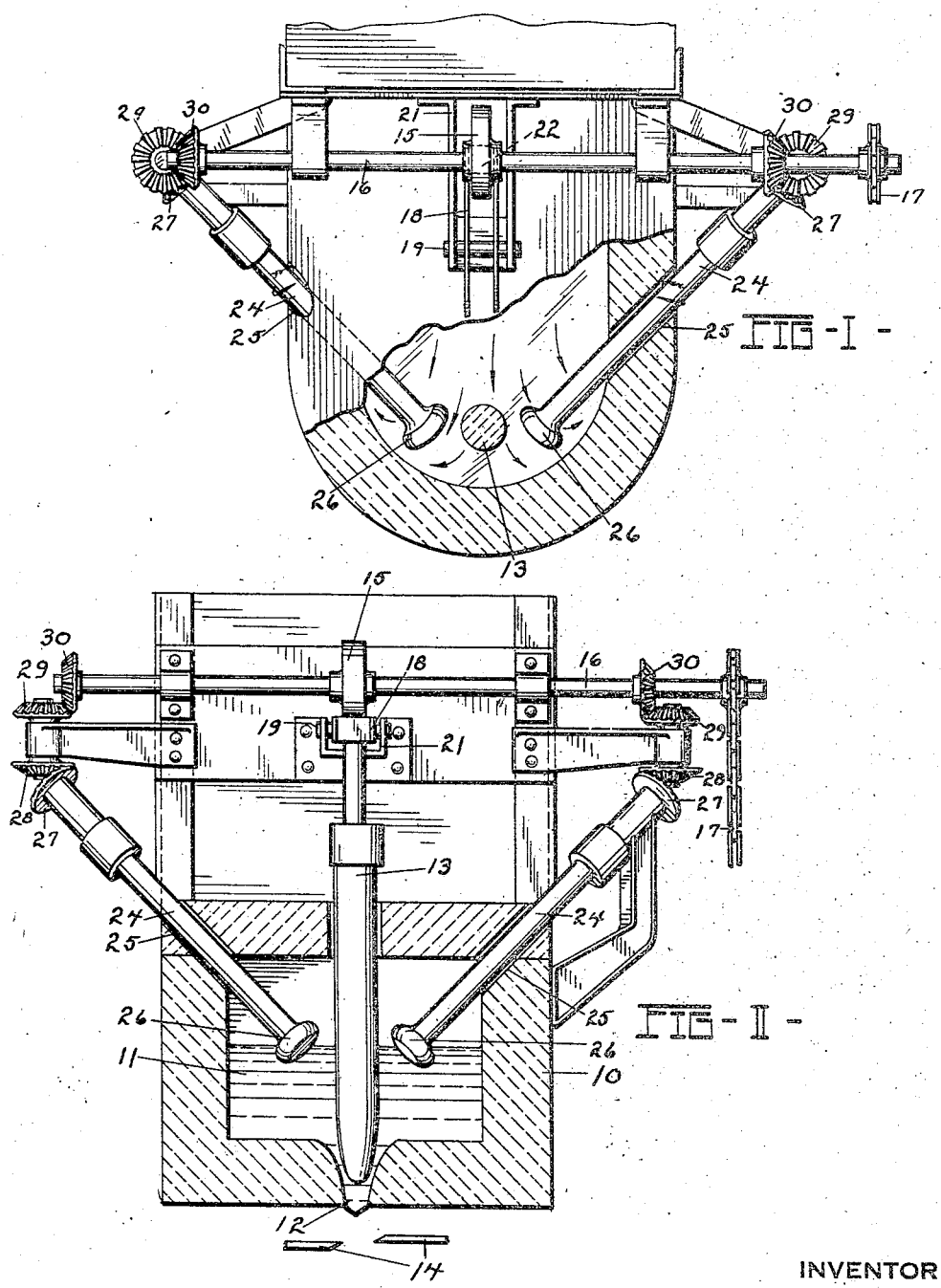

1,678,232

UNITED STATES PATENT OFFICE.

LEONARD D. SOUBIER, OF TOLEDO, OHIO, ASSIGNOR TO THE OWENS BOTTLE COMPANY, OF TOLEDO, OHIO, A CORPORATION OF OHIO.

GLASS FEEDER.

Application filed March 3, 1924. Serial No. 696,501.

My invention relates to apparatus for delivering individual masses or charges of molten glass from a supply body and is herein shown in connection with a glass feeder of the type in which the molten glass issues from an outlet opening in the bottom of a container, the flow of glass being regulated and controlled by a plug or regulator reciprocating in the glass over the outlet.

An object of the invention is to provide improved means for circulating the glass in the container in a manner to produce or maintain a uniformity of temperature and homogeneity of the issuing glass, thus preventing stagnation of the glass in the container, cold streaks or one sided cooling of the issuing glass.

Other objects of the invention will appear hereinafter.

In the accompanying drawings:

Figure 1 is a plan view, partly broken away, of an apparatus illustrating my invention.

Figure 2 is a part sectional elevation of the same.

The container 10 which may be the usual furnace boot extension is constantly supplied with molten glass 11 which discharges through an outlet opening 12 in the bottom of the container. A regulator 13, here shown as the usual vertically reciprocating plug, controls the flow in a well known manner. Shears 14 operate as usual in synchronism with the movements of the plug to sever the gobs of glass suspended from the walls of the outlet. The plug 13 is periodically reciprocated by means of a cam 15 secured to a drive shaft 16 which is rotated continuously by means of a sprocket wheel and chain 17 connected to a suitable source of power. The cam operates through a lever 18 having a fulcrum pin 19 mounted in a stationary bracket 21. The lever 18 is provided at its rear end with a cam engaging roll 22 and at its forward end has a connection with the regulator 13.

The molten glass flows forward from the furnace toward the outlet and tends to establish a channel or line of flow from the furnace to the side of the outlet nearest the furnace. There is a tendency, therefore, for the glass in front of the regulator to become comparatively cold and stagnant. This results in a lack of uniformity of temperature and cold streaks in the issuing glass, which produce defects in the finished ware. In order to overcome this objection, I provide stirring devices 24 here shown in the form of inclined rods projecting downward through openings 25 in the walls of the container. At their lower ends, the rods are provided with stirring knobs or heads 26 which dip into the glass. Each stirring rod has an operating connection with the drive shaft 16 through a train of gears 27, 28, 29 and 30, whereby a continuous rotation is imparted to the rod. The heads 26 dip into the glass at opposite sides of the plug 13 so that their rotation causes a circulation of glass as indicated by the arrows. This stirring of the glass operates to produce homogeneity and even temperature, and prevents stagnation of the glass in front of the regulator 13.

Modifications may be resorted to within the spirit and scope of my invention.

What I claim is:

1. The combination of a container for molten glass having a bottom outlet opening, a regulator projecting into the glass over the opening and controlling the discharge of glass through the opening, a stirring device dipping into the glass at one side of the regulator and substantially directly above the opening to agitate glass adjacent said regulator, and means for continuously rotating the stirring device about an axis at one side of the regulator.

2. The combination of a container for molten glass having an outlet opening in its bottom, a regulator projecting into the glass over the opening and controlling the discharge of glass through the opening, a stirring device dipping into the glass at one side of the regulator and substantially directly above the opening to agitate glass adjacent said regulator, and automatic means to continuously rotate the stirring device about an axis eccentric to that of the regulator.

3. The combination of a container for molten glass having a downwardly directed outlet opening, a regulator projecting downward into the glass over the opening and controlling the discharge of glass through the opening, a stirring device dipping into the glass at one side of the regulator and substantially directly above the opening to agitate glass adjacent said regulator, and automatic means for rotating the stirring device about an inclined axis.

4. A glass feeder comprising in combination a container for molten glass having an outlet in its bottom, an inclined stirring rod projecting downward into the glass above the outlet, and means to rotate said rod.

5. A glass feeder comprising in combination a container for molten glass having an outlet in its bottom, an inclined stirring rod projecting downward into the glass above the outlet, and means to rotate said rod, said rod being provided at its lower end with an enlargement forming a stirring head.

6. A glass feeder comprising in combination a container for molten glass having an outlet in its bottom, a regulating plug projecting into the glass over the outlet, means to periodically reciprocate said plug, an inclined stirring rod projecting downward into the glass above the outlet, and means to rotate said rod.

7. The combination of a container for molten glass having an outlet opening in the bottom thereof, a regulating plug extending downward into the glass over the outlet, means to periodically reciprocate said plug vertically, and an inclined stirring rod projecting downward into the glass at one side of and adjacent to the plug, and means for actuating said rod.

8. The combination of a container for molten glass having an outlet opening in the bottom thereof, a regulating plug extending downward into the glass over the outlet, means to periodically reciprocate said plug vertically, and an inclined stirring rod projecting downward into the glass at one side of and adjacent to the plug, and automatic means for rotating said rod about its own axis.

9. The combination of a container for molten glass having an outlet opening in the bottom thereof, a regulating plug extending downward into the glass over the outlet, means to periodically reciprocate said plug vertically, stirring devices projecting obliquely downward into the glass at opposite sides of the plug, and automatic means to rotate said stirring devices about axes separate from and inclined to that of the plug.

10. The combination of a container for molten glass having an outlet opening in the bottom thereof, a regulating plug extending downward into the glass over the outlet, means to periodically reciprocate said plug vertically, inclined stirring rods projecting downward into the glass at opposite sides of the plug and formed at their lower ends with stirring heads dipping into the glass, and automatic means for continuously rotating the stirring rods about their own axes.

Signed at Toledo, in the county of Lucas and State of Ohio, this 29th day of Feb., 1924.

LEONARD D. SOUBIER.